United States Patent [19]
Schlump

[11] Patent Number: 5,035,477
[45] Date of Patent: Jul. 30, 1991

[54] METHOD OF CHANGING THE SPOT DIAMETER OF SINGLE-MODE STEP-INDEX FIBERS, AND SINGLE-MODE FIBER COUPLING UNIT MADE BY SAID METHOD

[75] Inventor: Dieter Schlump, Stuttgart, Fed. Rep. of Germany

[73] Assignee: Alcatel N.V., Amsterdam, Netherlands

[21] Appl. No.: 398,777

[22] Filed: Aug. 24, 1989

[30] Foreign Application Priority Data

Aug. 25, 1988 [DE] Fed. Rep. of Germany ....... 3828814

[51] Int. Cl.$^5$ .............................................. G02B 6/16
[52] U.S. Cl. ......................................... 350/96.3; 65/2; 350/320
[58] Field of Search ................... 350/96.15, 96.2, 96.3, 350/320; 65/2

[56] References Cited

U.S. PATENT DOCUMENTS

| | | | |
|---|---|---|---|
| 4,099,835 | 7/1978 | French et al. | 350/96.3 |
| 4,659,353 | 4/1987 | Roba | 65/3.12 |

OTHER PUBLICATIONS

D. Marcuse: "Loss Analysis of Single-Mode Fiber Splices;" *Bell System Technical Journal* v 56 n 5 (May–Jun. 1987); pp. 703–718.

Primary Examiner—John D. Lee
Assistant Examiner—John Ngo
Attorney, Agent, or Firm—Christie, Parker & Hale

[57] ABSTRACT

In a method of changing the spot diameter of single-mode step-index fibers, a single-mode step-index fiber of a given length is heated below its melting point for a defined time in accordance with a temperature profile which varies, preferably linearly, over said length. In this manner, coupling losses between a single-mode laser and a single-mode step-index fiber and between single-mode step-index fibers with different parameters can be reduced to a minimum.

6 Claims, 3 Drawing Sheets

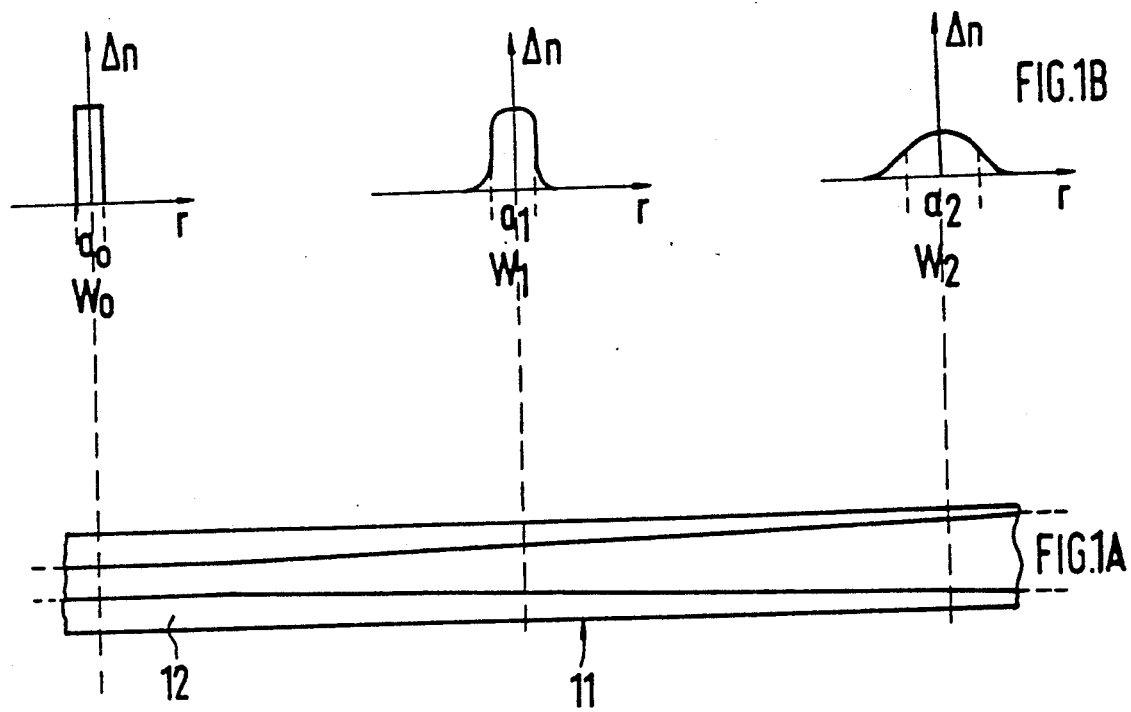
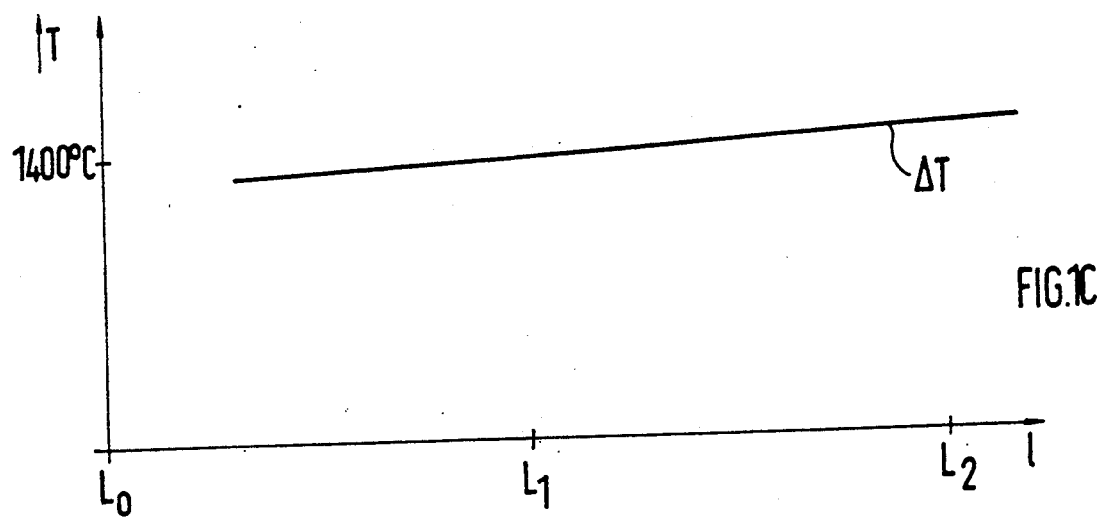

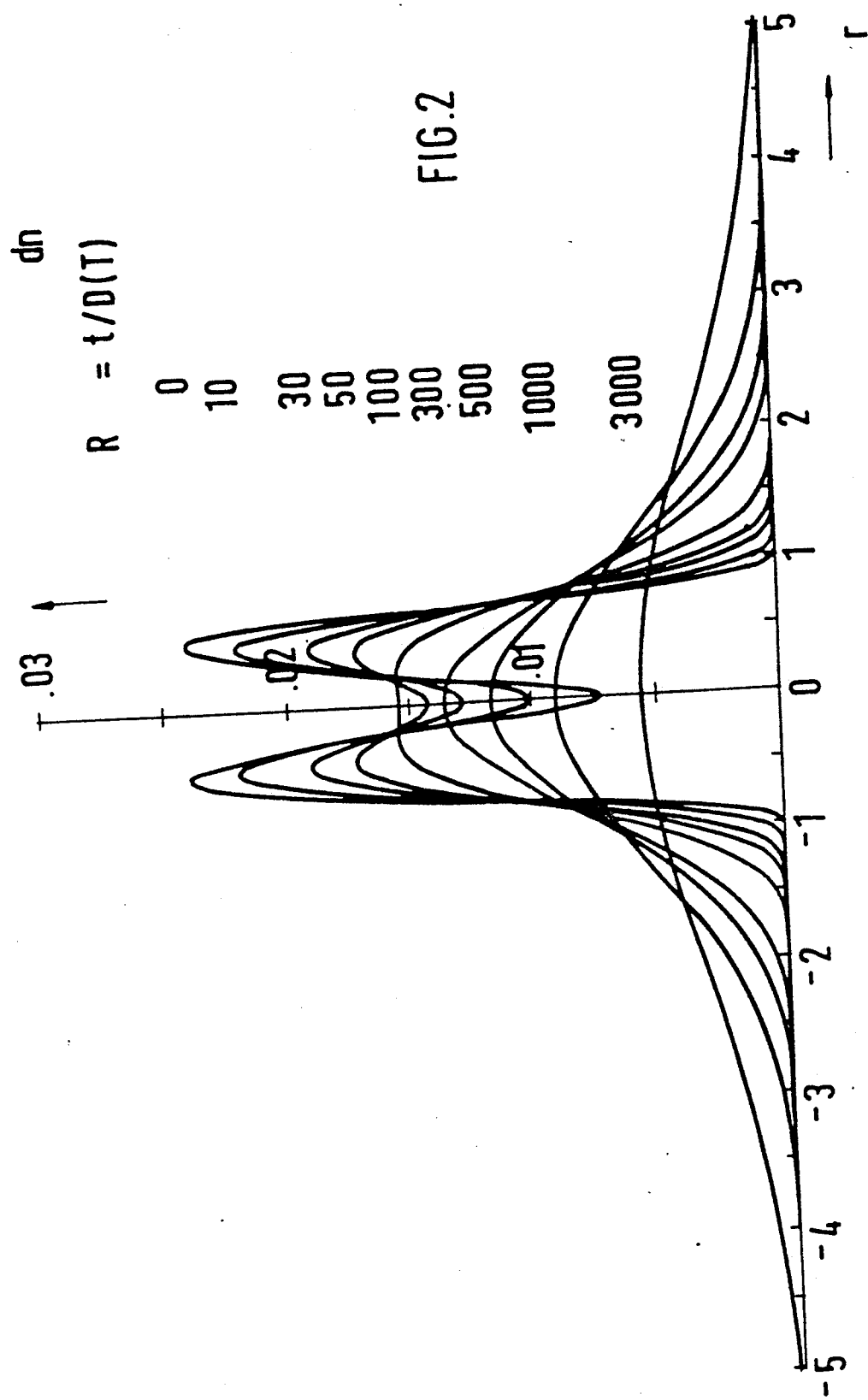

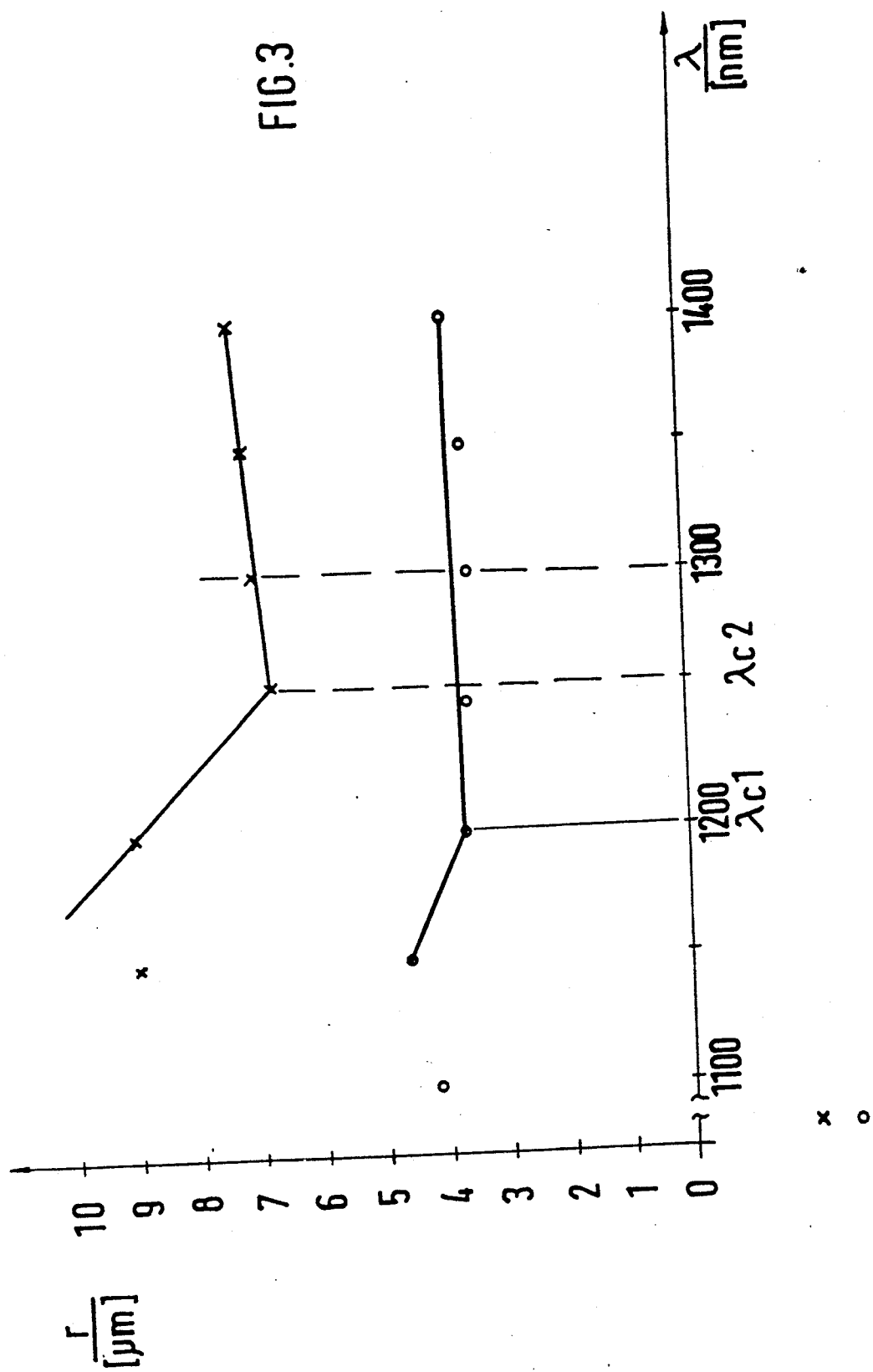

METHOD OF CHANGING THE SPOT DIAMETER OF SINGLE-MODE STEP-INDEX FIBERS, AND SINGLE-MODE FIBER COUPLING UNIT MADE BY SAID METHOD

TECHNICAL FIELD

The present invention relates to a method for preferably subsequently changing the spot diameter of single-mode step-index fibers.

It further relates to a coupling unit made by such a method and serving to connect single-mode lasers to single-mode fibers and/or interconnecting single-mode step-index fibers having different parameters, such as spot diameter, numerical aperture, etc.

CLAIM FOR PRIORITY

This application is based on and claims priority from an application first filed in Fed. Rep. Germany on Aug. 25, 1988 under serial number 38 28 814.1. To the extent such prior application may contain any additional information that might be of any assistance in the use and understanding of the invention claimed herein, it is hereby incorporated by reference.

BACKGROUND ART

To couple light from a single-mode laser into a single-mode step-index fiber, the spot diameter and the numerical aperture of the fiber must be matched to the laser so as to achieve minimum laser-to-fiber losses. The same applies analogously at the junction of two single-mode step-index fibers, where coupling losses are introduced if these fibers have different spot diameters and numerical apertures.

From an investigation by K. Shigihara et al, "MODAL FIELD TRANSFORMER BETWEEN DISSIMILAR WAVEGUIDES", ECOC 1986/pp. 185–188, it is known to provide a coupling unit between optical waveguides, lasers, and integrated optical units having waveguide profiles of different cross-sectional shape, namely rectangular and circular sections. To this end, a fiber of rectangular section whose cladding is made of so-called BK7 glass and whose core glass is doped with thallium ions is made. By heating a portion of this multimode fiber at 600° C. for three hours, a diffusion process is caused by an ion exchange between the thallium ions in the core and the potassium in the cladding. As a result, the profile of the fiber core increases continuously and changes continuously from the rectangular shape to the circular shape.

In this manner, a multimode coupling unit between optical devices with a rectangular waveguide on the one hand and multimode fibers of circular cross section on the other is obtained, but it cannot be used for the above-mentioned optical single-mode elements and step-index fibers of the same, circular cross-sectional shape. In addition, such multimode coupling units must be subjected to a relatively long diffusion process.

DISCLOSURE OF INVENTION

It is the object of the present invention to provide a method of the kind referred to in claim 1 and a single-mode fiber coupling unit of the kind referred to in claim 5 whereby coupling losses both between a single-mode laser and a single-mode step-index fiber and between single-mode step-index fibers having different parameters can be reduced to a minimum.

In accordance with the invention, a non-constant spot diameter in a length of a single-mode step-index fiber is achieved by heating the fiber in accordance with a predetermined temperature profile which varies over said length.

In this manner, a very simple construction of such a single-mode coupling unit and a considerably lower laser-to-fiber loss are obtained for connections between single-mode lasers and single-mode step-index fibers. The same applies analogously to a coupling unit used to interconnect different single-mode step-index fibers, which is very easy to manufacture and produces considerably lower splice losses.

Preferably, the temperature range is centered about 1400° C., and the heat is applied for about 2 minutes.

Very simple matching of the coupling unit to the two single-mode optical elements or step-index fibers to be interconnected is achieved by after the fiber has been so treated, it may be used in a single-mode coupling unit by breaking the length of fiber at a point having the desired spot-diameter.

BRIEF DESCRIPTION OF DRAWINGS

Further details of the invention will become apparent from the following descriptions of an embodiment of the invention when read in connection with the accompanying drawings, in which:

FIGS. 1A–C show schematically a portion of a single-mode fiber in a longitudinal section (A), the refractive-index profile in three different regions along the single-mode fiber (B), and the temperature profile applied to change the spot diameter of the single-mode fiber (C);

FIG. 2 shows the refractive-index profile of a single-mode fiber for different degrees of diffusion, and FIG. 3 shows the spot radii at different wavelengths of a conventional single-mode step-index fiber before and after profile diffusion.

BEST MODE FOR CARRYING OUT THE INVENTION

The portion of a single-mode fiber 11 shown in FIG. 1A is made from a conventional single-mode step-index fiber by the method according to the present invention, this single-mode fiber 11 representing a coupling unit in which the spot diameter or core diameter varies essentially continuously over the length of the unit, so that it is possible to match different spot diameters of optical elements to be interconnected, such as lasers, single-mode fibers, and the like.

To explain how this is achieved, the following should first be mentioned.

Joints between single-mode step-index fibers with different spot diameters introduce coupling losses. For splices, the coupling efficiency is $$\eta = 4 \cdot \frac{W_1^2 W_2^2}{(W_1^2 + W_2^2)^2} \qquad (1)$$

where $W_1$ and $W_2$ are the spot diameters of the two fibers to be joined. The losses caused by axial and angular misalignment are not taken into account in this equation. It is therefore necessary to match the spot diameters of the fibers in order to obtain low splice losses.

The spot diameter of a single-mode step-index fiber is, to a good approximation in the range of the normalized frequency V of $1.6 < V < 2.6$, $$W_o = a \cdot \frac{2.6}{V} \quad (2)$$

where a is the core diameter of such a fiber.

The core diameter of a single-mode step-index fiber is $$a = (V \cdot \lambda)/(2 \cdot \pi \cdot n_1 \cdot \sqrt{2\Delta n}) \quad (3)$$

where
$\lambda$ = operating wavelength $$\Delta n = (n_1^2 - n_2^2)/(2 \cdot n_1^2) \quad (4)$$

i.e., the normalized refractive-index difference,
$n_1$ = core refractive index
$n_2$ = cladding refractive index.

The numerical aperature is given by $$NA = n_1 \cdot \sqrt{2\Delta n} \quad (5)$$

By the diffusion of the fiber doping material, the product of effective core diameter a and effective refractive-index difference $\Delta n$ is kept constant, so that $$a \cdot \Delta n = K \quad (6)$$

Thus, from Eq. (3), $$a \cdot \Delta n = \frac{1}{2\pi \cdot \sqrt{2}} \sqrt{\Delta n} \cdot V_c \cdot \lambda_c = K \quad (7)$$

where $V_c$ is the normalized frequency at the cutoff wavelength $\lambda_c$.

It becomes apparent that a change of the cutoff wavelength $\lambda_c$, which is given by $$\lambda_c = \frac{2 \cdot \sqrt{2} \cdot \pi \cdot K}{V_c \cdot \sqrt{\Delta n}} \quad (8)$$

is produced by the profile diffusion, which varies essentially as $$\lambda_c \sim \frac{1}{\sqrt{\Delta n}} \quad (9)$$

This is confirmed in practice, as shown in FIG. 3. The small change in cutoff wavelength is not important. The increase in the effective core diameter at a constant V figure thus results in an increase in the spot diameter $W_o$.

From Eqs. (2), (3), and (7), $$W_o = \frac{2.6 \cdot \lambda}{2\pi \cdot n_1 \cdot \sqrt{\frac{2 \cdot K}{a}}} \quad (10)$$

Thus, $$W_o \sim \sqrt{a} \quad (11)$$

An increase in the effective core diameter of the fiber causes an increase in the spot diameter.

This means that the spot diameter $W_o$ of such a fiber can be selectively increased by increasing the core diameter and simultaneously reducing the refractive-index difference $\Delta n$.

According to the invention, an increase in the core diameter of a single-mode step-index fiber according to the above approximation (11) for the purpose of increasing the spot diameter of the fiber is achieved by heating a section of the single-mode step-index fiber of a given length to a temperature of about 1400° C. for a given time t, so that during that time, out-diffusion of the $GeO_2$ dopant in the $SiO_2$ can take place.

FIG. 2 shows a refractive-index profile as a function of the core radius of a single-mode step-index fiber treated in this way. The parameter used in FIG. 2 is the normalized parameter $A = t/D(T)$, where D(T) is the temperature-dependent diffusion constant of $GeO_2$ in $SiO_2$. It can be seen that at a given temperature T of, e.g., 1400° C., the refractive-index difference decreases with time and the core radius simultaneously increases.

If a single-mode step-index fiber of length l is subjected to a temperature profile as shown in FIG. 1C, e.g., to a temperature $\Delta T$ varying, in this case increasing, linearly around 1400° C., a continuous increase in the core diameter and, thus, a continuous increase in the spot diameter of the fiber will be obtained after a given time $\Delta t$ due to the temperature-dependent diffusion constant A, as can be seen in FIG. 1A, showing a longitudinal section of the single-mode fiber, and in FIG. 1B, showing the refractive-index profiles at three points $L_0$, $L_1$, $L_2$ of the fiber for the spot diameters $W_0$, $W_1$, $W_2$. According to the embodiment of FIG. 1, a single-mode step-index fiber section of a given length is thus subjected to the temperature profile for different times, so that a single-mode fiber 11 is obtained which has in its initial region 12 a refractive-index profile corresponding to the original refractive-index profile of the fiber, while over the length l, the refractive-index profile varies essentially continuously in the manner shown for two further sections.

To match the different spot diameters of two single-mode step-index fibers to be joined, the single-mode fiber 11 created in FIG. 1A with a continuously varying spot diameter in accordance with the invention can be broken apart at one or both ends at a suitable point where the spot diameter has the desired value. A single-mode fiber coupling unit is thus provided by means of which two single-mode step-index fibers can be spliced in a simple way with the two spot diameters matched in an optimal manner.

In a practical embodiment, a single-mode step-index fiber was heated to incandescence, i.e., in the above-mentioned temperature range, for about two minutes. Measurements at different wavelengths showed that a spot-radius increase by a factor of 2 can thus be achieved.

While the principles of the invention have been described above in connection with a single-mode step-index fiber made from $GeO_2$-doped $SiO_2$, it is to be understood that the method according to the invention can also be used with fibers whose core is undoped, but whose cladding glass is doped with fluorine, for example. Through the heating, the dopant diffuses into the core, whereby the spot diameter of the latter decreases.

I claim:

1. Method of changing the spot diameter of single-mode step-index fibers comprising the step of heating a single-mode step-index fiber of a given length below its melting point for a defined time in accordance with a temperature profile which varies approximately linearly over said length.

2. A method as claimed in claim 1, wherein said heating step is conducted at a temperature range around 1400° C.

3. A method as claimed in claim 1, wherein said defined time is about 2 minutes.

4. A method as claimed in claim 1, further comprising the step of breaking the thus heated single-mode fiber at a point where the spot diameter has the desired value.

5. Single-mode fiber coupling unit comprising a single-mode step-index fiber section of a given length and having a core surrounded by a cladding, whose associated spot diameter varies approximately linearly over the length of the section, wherein the product of the effective diameter of the fiber core times the normalized difference of the refractive indices of the core and the cladding is approximately constant.

6. A single-mode fiber coupling unit as claimed in claim 5 wherein the single-mode fiber section has a spot diameter having a predetermined value at an open end thereof.

* * * * *